(12) United States Patent
Baeuerle

(10) Patent No.: US 7,487,751 B2
(45) Date of Patent: Feb. 10, 2009

(54) METHOD AND DEVICE FOR OPERATING AN INTERNAL COMBUSTION ENGINE

(75) Inventor: Michael Baeuerle, Ditzingen-Heimerdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/998,060

(22) Filed: Nov. 27, 2007

(65) Prior Publication Data

US 2008/0072874 A1    Mar. 27, 2008

(51) Int. Cl.
*F01L 1/34*    (2006.01)
(52) U.S. Cl. .................. 123/90.15; 123/559.2; 123/321
(58) Field of Classification Search ............. 123/559.2, 123/90.15–90.18
See application file for complete search history.

(56) References Cited

U.S. PATENT DOCUMENTS

| 4,592,319 | A |   | 6/1986  | Meistrick |            |
|-----------|---|---|---------|-----------|------------|
| 4,932,372 | A | * | 6/1990  | Meneely   | 123/182.1  |
| 5,937,807 | A | * | 8/1999  | Peters et al. | 123/90.15 |
| 6,105,555 | A | * | 8/2000  | Weber et al. | 123/493 |
| 6,595,183 | B1 | * | 7/2003 | Olofsson | 123/315 |
| 6,651,618 | B1 |  | 11/2003 | Coleman et al. | |
| 6,883,492 | B2 | * | 4/2005 | Vanderpoel et al. | 123/321 |
| 7,152,576 | B2 | * | 12/2006 | Vanderpoel et al. | 123/321 |
| 7,299,623 | B2 | * | 11/2007 | Stanglmaier et al. | 60/274 |
| 7,363,890 | B2 | * | 4/2008 | Baeuerle | 123/90.15 |

FOREIGN PATENT DOCUMENTS

| WO | WO 03/058048  | 7/2003 |
| WO | WO 2004/059131 | 7/2004 |

OTHER PUBLICATIONS

Bosch, "Automotive Handbook", 23rd updated and expanded edition, Braunschweig, Wiesbaden, Vieweg (1999).

* cited by examiner

*Primary Examiner*—Erick Solis
(74) *Attorney, Agent, or Firm*—Kenyon & Kenyon LLP

(57) ABSTRACT

A method and a device for operating an internal combustion engine improve the response of the internal combustion engine and increase its torque. An exhaust valve of the combustion chamber of the internal combustion engine is opened during a discharge phase of the internal combustion engine for discharging exhaust gas, generated via combustion, from a combustion chamber into an exhaust system of the internal combustion engine. The exhaust valve is closed again and re-opened during this discharge phase.

18 Claims, 3 Drawing Sheets

METHOD AND DEVICE FOR OPERATING AN INTERNAL COMBUSTION ENGINE

BACKGROUND INFORMATION

From "Bosch, Automotive Handbook, $23^{rd}$ updated and expanded edition, Braunschweig, Wiesbaden, Vieweg 1999" it is known that during a discharge phase of the internal combustion engine for discharging exhaust gas, generated via combustion, from a combustion chamber into an exhaust system of the internal combustion engine, an exhaust valve of the combustion chamber of the engine is opened. The combustion chamber is formed by a cylinder.

SUMMARY OF THE INVENTION

The method and the device of the present invention for operating an internal combustion engine have the advantage over the related art that the exhaust valve is closed again and re-opened during this discharge phase. In this way, residual gas or exhaust gas may be purged from the combustion chamber very efficiently, thereby reducing the engine's tendency to knock. In addition, the residual gas or exhaust gas may be almost completely replaced by fresh air via the air supply which results in a greater combustion chamber filling. In the event of the use of an exhaust gas turbocharger, a turbine output may additionally be increased due to the multiple exhaust stroke and a higher charging pressure of the compressor of the exhaust gas turbocharger may be set. A greater torque of the internal combustion may thus be achieved.

It is particularly advantageous when the exhaust valve is opened multiple times during the discharge phase only when an output variable, preferably the engine speed, falls below a predefined threshold value. In this way, the response of the possibly existing exhaust gas turbocharger may be improved particularly in a lower speed range due to the additional turbine output, thereby avoiding the turbo lag which otherwise prevails in this speed range.

A further advantage arises when the exhaust valve is opened multiple times during the discharge phase only when a value for the load of the internal combustion engine, preferably a driver intent moment, exceeds a predefined threshold value. It is ensured in this way that the torque, increased by the multiple exhaust stroke, is available at high load. If this measure is combined with the fact that multiple opening operations of the exhaust valve during the discharge phase is carried out only in a lower speed range, it is ensured that, at low speed and high load demand, the required torque is able to be provided as quickly as possible.

A further advantage arises when the exhaust valve is closed during the discharge phase when a first exhaust stroke has subsided. After the first exhaust stroke has subsided, the remaining exhaust gas in the combustion chamber may be compressed by the cylinder piston, for example, in order, at subsequent re-opening of the exhaust valve during the same discharge phase, to dynamically eject the remaining exhaust gas from the combustion chamber into the exhaust system, thereby obtaining in a particularly simple way the greater filling, the reduction in the tendency to knock, and, in the presence of an exhaust gas turbocharger, a higher charging pressure, and thus ultimately a greater torque.

Subsiding of the first exhaust stroke may be detected particularly easily as a function of an exhaust gas backpressure or a combustion chamber internal pressure.

DETAILED DESCRIPTION

Figure 1:
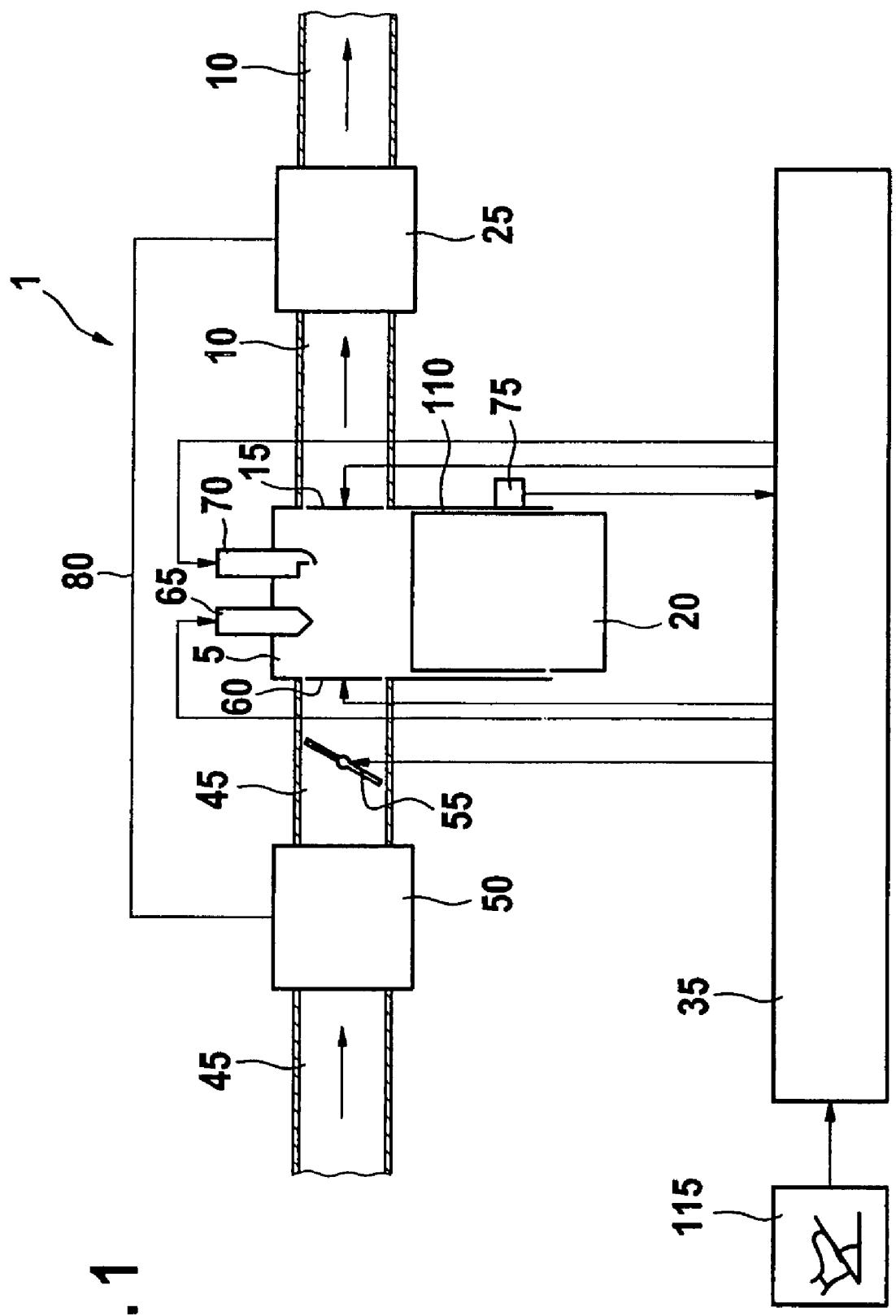
FIG. 1 shows a schematic view of an internal combustion engine.

In FIG. 1, reference numeral 1 indicates an internal combustion engine which may power a vehicle, for example. Engine 1 may be designed as a gasoline engine or a diesel engine. As an example, it is assumed in the following that engine 1 is designed as a gasoline engine. Engine 1 includes at least one cylinder 110. As an example and for the sake of simplicity, engine 1 has a single cylinder. Fresh air is supplied to cylinder 110 via an air supply 45. The flow direction of the fresh air is indicated in FIG. 1 by an arrow. According to the exemplary embodiment in FIG. 1, a compressor 50 of an exhaust gas turbocharger is situated in air supply 45. The exhaust gas turbocharger is not necessarily needed for the function of the present invention; however, the present invention particularly advantageously affects the operation of internal combustion engine 1 using an exhaust gas turbocharger. A throttle valve 55 is situated in air supply 45 downstream from compressor 50 in the flow direction of the fresh air, the throttle valve being activated by an engine controller 35 for setting a predefined opening angle. The opening angle of throttle valve 55 to be set by engine controller 35 may be predefined by the driver of the vehicle as a function of an operating angle of an accelerator pedal. An accelerator pedal module 115, which detects the operating angle of the accelerator pedal, is provided for this purpose, the accelerator pedal module transmitting the operating angle of the accelerator pedal to engine controller 35.

Engine controller 35 determines a setpoint value for an output variable of engine 1, e.g., a torque, a power, or a variable derived from the torque and/or the power. As an example it should be assumed in the following that this output variable is a torque. Engine controller 35 thus determines a driver intent moment from the accelerator pedal's operating angle and controls throttle valve 44 correspondingly to the driver intent moment to be set. The fresh air is ultimately supplied to a combustion chamber 5 of cylinder 110 via an intake valve 60. According to FIG. 1, intake valve 60 is also controlled by engine controller 35 for setting predefined opening and closing times in order to perform a four-stroke operation of internal combustion engine 1 as is known from "Bosch, Automotive Handbook, $23^{rd}$ edition, 1999." The opening and closing times of intake valve 60 may also be set via a camshaft in a manner known to those skilled in the art.

According to FIG. 1, fuel is supplied directly to combustion chamber 5 via a fuel injector 65. Via a corresponding fuel injector, fuel may alternatively also be supplied to air supply 45 in the flow direction upstream or downstream from throttle valve 55. For setting a predefined injection time and thus a predefined fuel quantity to be supplied, fuel injector 65 is likewise controlled by engine controller 35. In a manner known to those skilled in the art, the fuel quantity may be predefined in such a way that a predefined air/fuel mix ratio results in combustion chamber 5. The air/fuel mixture contained in combustion chamber 5 is ignited via a spark plug 70 which is likewise controlled by engine controller 35. Control of spark plug 70 is used for setting a suitable ignition point, e.g., in order to heat a catalytic converter situated in an exhaust system 10 of the internal combustion engine (not shown in FIG. 1), or in order to build up a torque reserve or the like. Due to the combustion of the air/fuel mixture in combustion chamber 5, a piston 20 of cylinder 110 is driven, which in turn drives a crankshaft of internal combustion engine 1 (not shown). A crankshaft sensor 75 in the area of cylinder 110 detects the crankshaft position and conveys the determined instantaneous crankshaft angle to engine controller 35.

Furthermore, an exhaust valve 15 is provided which is opened in a discharge phase of internal combustion engine 1 in order to eject the exhaust gas, generated during the combustion of the air/fuel mixture in combustion chamber 5, into exhaust system 10. Exhaust valve 15 is likewise directly controlled by engine controller 35 or via a camshaft for setting predefined opening and closing times in a manner known to those skilled in the art. The flow direction of the exhaust gas in exhaust system 10 is also indicated by arrows in FIG. 1. According to this exemplary embodiment, a turbine 25 of the exhaust gas turbocharger is situated in exhaust system 10, the turbine being driven by exhaust gas. Turbine 25 is linked to compressor 50 via a shaft 80, so that the turbine output of turbine 25 may be converted into a compressor output of compressor 50 for compressing the air supplied to internal combustion engine 1. The turbine output may be influenced via a variable turbine geometry or by a bypass of the exhaust system bypassing turbine 25 (not shown), the turbine geometry or an opening angle of a bypass valve in the bypass around turbine 25 being able to be controlled by engine controller 35 for setting an intended charging pressure. The intended charging pressure may also be derived from the driver intent moment to be implemented in a manner known to those skilled in the art.

Figure 3:
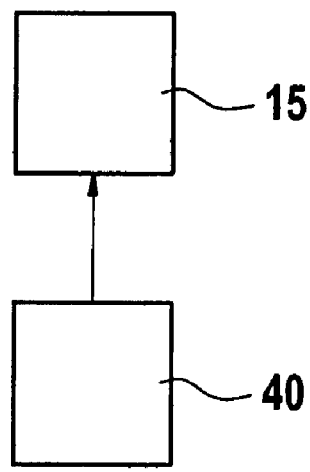
FIG. 3 shows a block diagram for the activation of an exhaust valve of the internal combustion engine.

FIG. 3 illustrates a block diagram showing a device 40 which influences the opening and closing times of exhaust valve 15. According to the exemplary embodiment shown in FIG. 1, this device 40 may be engine controller 35 which is able to arbitrarily control the opening and closing times of intake valve 60 and exhaust valve 15 via an electrohydraulic or electromagnetic valve gear. Device 40 may alternatively include a camshaft 30 which determines the opening and closing times of exhaust valve 15. The use of camshaft 30 for setting the opening and closing times of exhaust valve 15 is described in the following.

Figure 2:
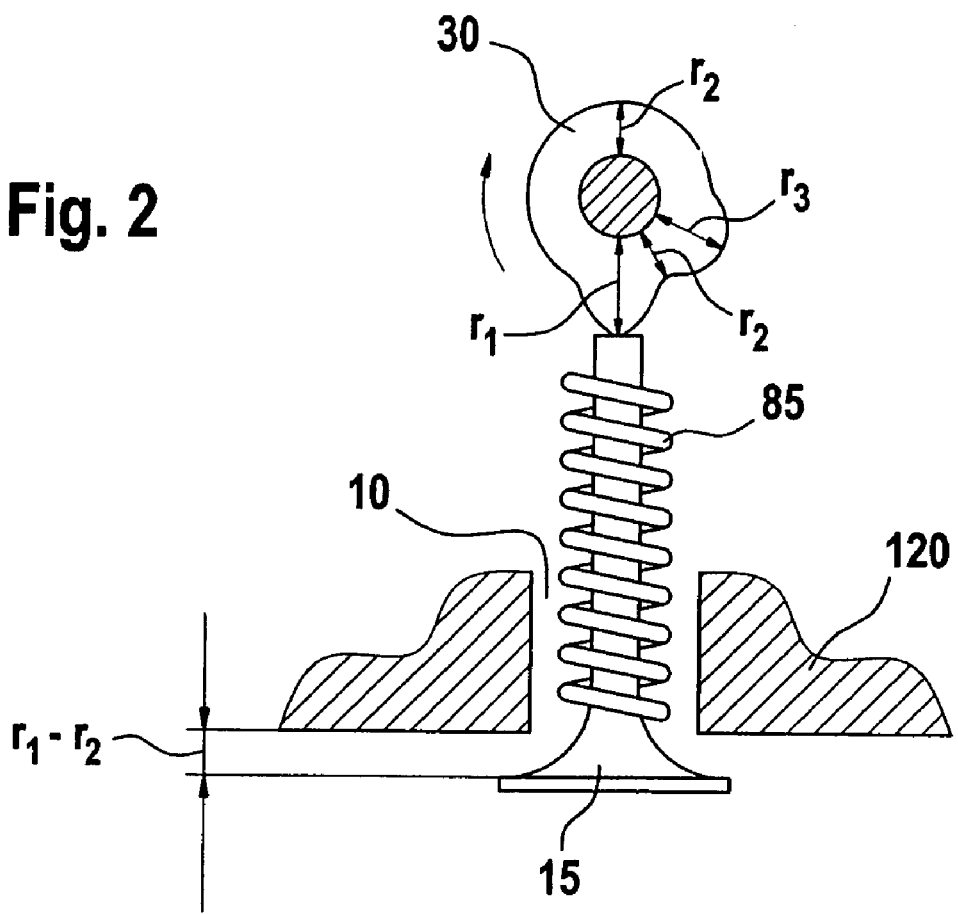
FIG. 2 shows a valve control via the camshaft.
Figure 4:
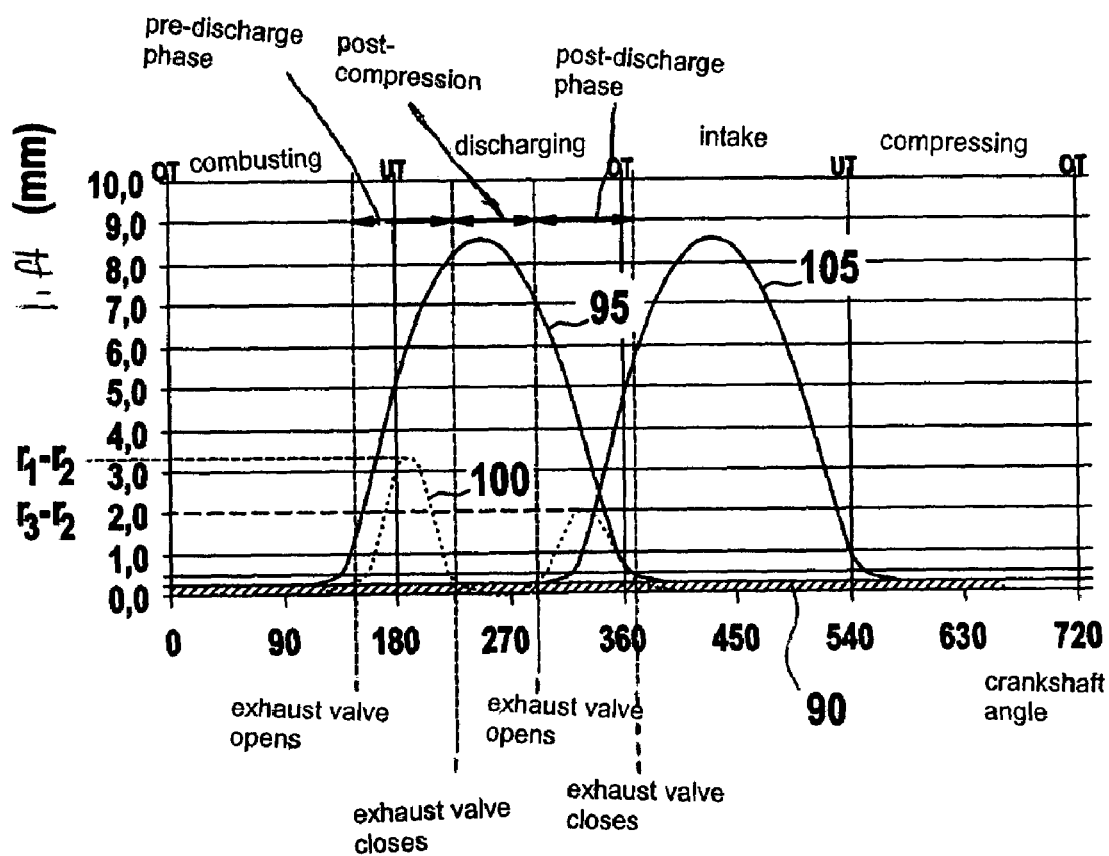
FIG. 4 shows a diagram representing the lift of the intake valve and the exhaust valve of the internal combustion engine across the crankshaft angle.

In a four-stroke process, the camshaft rotating at half the engine speed is normally driven by the crankshaft for timing the gas exchange. The camshaft opens the gas exchange valves, i.e., intake valve 60 and exhaust valve 15, separately designed for discharging the exhaust gases into exhaust system 10 and drawing in fresh gases from air supply 45, against the valve springs. Using exhaust valve 15 as an example, FIG. 2 shows clockwise rotating camshaft 30 which opens exhaust valve 15 against a valve spring 85 for discharging the exhaust gases into exhaust system 10. In FIG. 2, reference numeral 120 indicates one wall of combustion chamber 5. FIG. 4 shows the dependency of the lift of intake valve 60 and exhaust valve 15 as a function of the crankshaft angle. Reference numeral 95 indicates a curve of the lift of exhaust valve 15 at a conventional profile of camshaft 30. Reference numeral 105 indicates a curve of the lift of intake valve 60 also at a conventional cam profile. Reference numeral 100 indicates the curve of the lift of exhaust valve 15 at a cam profile according to the present invention as shown in FIG. 2. In FIG. 4, the hatched area and reference numeral 90 indicate the area of the lift of intake valve 60 and exhaust valve 15 which is lost maximally due to the valve lash. First, the conventional curve of lift 95 of exhaust valve 15 and the conventional curve of lift 105 of intake valve 60 are considered. Short, i.e., up to a crankshaft angle of approximately 60°, of a bottom dead center (BDC) of piston 20, exhaust valve 15 opens according to lift curve 95 and approximately 50% of the combustion gases or exhaust gases leave combustion chamber 5 into exhaust system 10 during the pre-discharge phase under a supercritical pressure ratio. As it moves subsequently upward during the exhaust stroke, piston 20 removes nearly all of the combustion gases from combustion chamber 5. Short, i.e., up to a crankshaft angle of approximately 80°, of a top dead center (TDC) of piston 20, intake valve 60 opens according to lift curve 105 with exhaust valve 15 still opened.

According to the present invention, exhaust valve 15 is not opened according to lift curve 95 but according to lift curve 100. After opening during the discharge phase, exhaust valve 15 is to be closed and opened again. The discharge phase is defined by the crankshaft angle range, for example, in which the lift of exhaust valve 15 is greater than zero according to conventional lift curve 95. It is possible in this way to implement multiple opening operations of exhaust valve 15 during the discharge phase. As an example, it is assumed in the following that exhaust valve 15 is opened twice during the discharge phase. According to lift curve 100, exhaust valve 15 may be opened for the first time short, i.e., up to a crankshaft angle of 60°, of the bottom dead center of piston 20. The first time opening of the exhaust valve during the discharge phase may also take place either at or after the time of reaching the bottom dead center of piston 20. As an example, it is assumed in the following, however, that exhaust valve 15 is opened at a crankshaft angle of approximately 30° before the bottom dead center of piston 20. Exhaust valve 15 reaches a first maximum value r1–r2 of the lift approximately at the bottom dead center of piston 20 in order to close again at a crankshaft angle of approximately 45° after the bottom dead center of piston 20. The previously described pre-discharge phase in which approximately 50% of the exhaust gas mass flows into exhaust system 10 under a certain residual pressure from the expansion losses of the preceding expansion stroke is utilized during this first opening of exhaust valve 15 during the discharge phase. As described, exhaust valve 15 is subsequently closed at a crankshaft angle of approximately 45° after the bottom dead center of piston 20 so that the remaining exhaust gas mass in combustion chamber 5 is subsequently post-compressed by the upward movement of piston 20.

Shortly before reaching the top dead center, in the example in FIG. 4 at a crankshaft angle of approximately 80° before the top dead center of piston 20, exhaust valve 15 is re-opened in order to feed the post-compressed exhaust gas mass in the form of a second exhaust stroke into exhaust system 10 and there onto turbine 25. During this second opening of exhaust valve 15, the lift of exhaust valve 15 reaches a second maximum value r3–r2 at a crankshaft angle of approximately 40° before the top dead center of piston 20, the second maximum value being different from first maximum value r1–r2, as shown in FIG. 4. Second maximum value r3–r2 is less than first maximum value r1–r2 according to the elected example. Both maximum values could also be equal or second maximum value r3–r2 could also be greater than first maximum value r1–r2. However, due to the post-compressed exhaust gas mass, a second maximum value r3–r2 less than first maximum value r1–r2 is sufficient. Shortly after the top dead center of piston 20, exhaust valve 15 is closed again for the second time during the discharge phase. Both opening times of exhaust valve 15 during the discharge phase are approximately equal.

During the second opening of exhaust valve 15 during the discharge phase, the additional compression energy of the exhaust gas, previously obtained during the post-compression phase, is supplied to turbine 25 which subsequently converts the higher power into higher charging pressure via compressor 50. This procedure may be supported by very rapid opening actions of the exhaust valve in order to supply the exhaust gas energy to the turbine via the exhaust valve with minimal loss. The opening speed of the exhaust valve during the discharge phase may be higher during multiple opening operations than during a single opening. In addition, the high power of the exhaust gas column results in an underpressure phase at exhaust valve 15 after the second exhaust stroke, the underpressure phase efficiently purging the hot residual gas or exhaust gas still in combustion chamber 5 of cylinder 110 into exhaust system 10 and, with already opened intake valve 60 according to lift curve 105, this exhaust gas is replaced by cold fresh air. The temperature in combustion chamber 5 is considerably reduced which results in a clear reduction in the tendency to knock and the exhaust gas is nearly completely replaced by the fresh air, making it possible to achieve an as complete as possible filling of combustion chamber 5. All of this results in a higher torque.

It may be provided to implement the second opening of exhaust valve 15 at a crankshaft angle of up to approximately 90° before the top dead center of piston 20. The values specified above for the crankshaft angle for the first and second opening of exhaust valve 15 are, however, merely indications so that exhaust valve 15 may also be opened for the first time at a crankshaft angle of more than 60° before the bottom dead center and for the second time also at a crankshaft angle of more than 90° before the top dead center of piston 20.

For the first closing of exhaust valve 15 during the discharge phase, it is expedient to wait for the first exhaust stroke to subside, i.e., to wait for the pre-discharge phase to subside. This means that exhaust valve 15 is closed during the discharge phase when the first exhaust stroke of the exhaust gas into exhaust system 10 has subsided. Subsiding of the first exhaust stroke may be detected as a function of an exhaust gas backpressure or a combustion chamber internal pressure. Subsiding of the first exhaust stroke as a function of the exhaust gas backpressure or the combustion chamber internal pressure may be determined on a test bench with the aid of an adaptation. The first exhaust stroke is considered to have subsided as soon as the exhaust gas backpressure falls below a predefined threshold value. Correspondingly, the first exhaust stroke may be viewed as subsided when the combustion chamber internal pressure falls below a predefined threshold value. The predefined threshold value for the exhaust gas backpressure or the combustion chamber internal pressure may suitably be selected in such a way that it is ensured that the exhaust gas mass, to be moved into exhaust system 10 by the residual pressure from the expansion phase, is preferably completely ejected into the exhaust system 10 and that adequate time remains for post-compression of the exhaust gas in combustion chamber 5 with exhaust valve 15 closed during the discharge phase. The exhaust gas backpressure or the combustion chamber internal pressure may be measured using a suitable pressure sensor or may be modeled from other operating variables of internal combustion engine 1 in a manner known to those skilled in the art.

The crankshaft angle after the bottom dead center of piston 20, determined during the application, at which the exhaust gas backpressure or the combustion chamber internal pressure reaches the respective threshold value, is then used during operation of internal combustion engine 1 as the crankshaft angle at which exhaust valve 15 is closed for the first time.

Implementation of lift curve 100 may be achieved via a suitable cam profile of camshaft 30 as in FIG. 2, for example. Starting from a base radius r2, the radius of camshaft 30 increases during a clockwise movement initially to a first maximum radius r1 in order to fall back to base radius r2 and to subsequently increase to a second maximum radius r3. Base radius r2 is subsequently assumed again. If camshaft 30 presses against exhaust valve 15 with its base radius r2, exhaust valve 15 is closed. As soon as camshaft 30 presses against exhaust valve 15 with a radius greater than base radius r2, exhaust valve 15 opens against the force of spring 85. First maximum value r1–r2 for the lift is reached when camshaft 30 presses against exhaust valve 15 with its first maximum value r1 for the radius, as shown in FIG. 2. Second maximum value r3–r2 is reached when camshaft 30 presses against exhaust valve 15 with its second maximum value r3 for the radius. Exhaust valve 15 is also opened when camshaft 30 presses against exhaust valve 15 with a radius greater than base radius r2 and less than first maximum value r1 or less than second maximum value r3 for the radius.

According to an advantageous refinement of the present invention, two different cam profiles for adjusting the lift curve of the exhaust valve may be provided, the cam profiles being able to be switched. In principle, such a procedure is also known from "Bosch, Automotive Handbook, $23^{rd}$ edition, 1999." It is provided in the present case to switch from the described cam profile for the discharge phase with two or more openings of exhaust valve 15 to conventional lift curve 95 for the exhaust valve whose maximum lift is also substantially longer than first maximum value r1–r2 of lift curve 100. Of course, the maximum of conventional lift curve 95 may alternatively also correspond to first maximum value r1–r2 or second maximum value r1–r3 of lift curve 100. As an example, it should be assumed in the following that the maximum of lift curve 95 according to FIG. 4 is greater than first maximum value r1–r2 and thus also greater than second maximum value r1–r3 for lift curve 100.

The discharge phase during the second opening of exhaust valve 15 is also referred to as post-discharge phase.

The possibility may be provided to switch between both cam profiles as a function of an output variable of the internal combustion engine. The engine speed may be selected as the output variable. This should be assumed in the following as an example. If the engine speed falls below a predefined threshold value, exhaust valve 15 is operated with a first cam profile according to FIG. 2 resulting in lift curve 100. Otherwise, exhaust valve 15 is operated with a second cam profile resulting in conventional lift curve 95. At engine speeds above the predefined threshold value with a long lift, exhaust valve 15 is only opened once, while at engine speeds below the predefined threshold with a comparatively short lift, exhaust valve 15 is opened multiple times, twice in the described example. A value of 2,000 rpm, for example, may be selected as the predefined threshold value for the engine speed. Lift curve 105 for intake valve 60 also has the same maximum as lift curve 95 for exhaust valve 15. Due to the long lift, shorter gas exchange phases, such as occur at high engine speeds and particularly at a high load, may be better taken into account. Multiple opening operations of the exhaust valve during the discharge phase at lower speeds, i.e., speeds below the predefined threshold value, enables an improved response of internal combustion engine 1 in this speed range and in particular an improved response of the exhaust gas turbocharger due to the described filling-enhancing and torque-enhancing effects, so that the turbo lag in this speed range may be largely avoided.

In a further advantageous refinement of the present invention, multiple opening operations of exhaust valve 15 during the discharge phase may be provided only for the event that a value for the load of internal combustion engine 1 exceeds a predefined threshold value. The value for the load may be derived from the driver intent moment or may be equated with the same. In the event of a correspondingly high load demand, the filling-enhancing and torque-enhancing effect of multiple opening operations of exhaust valve 15 during the discharge phase is made available above the threshold value. At a corresponding load demand, the response of internal combustion engine 1 and in particular the response of the exhaust gas turbocharger are thus increased, so that the driver intent may be implemented preferably without delay. The correspondingly different cam profiles may alternatively also be used as a function of the load, i.e., the cam profile according to FIG. 2, for example, and thus lift curve 100 may be provided in a first load range above the predefined threshold value for the load, and a cam profile may be provided below the threshold value for the load to generate lift curve 95 which may differ from lift curve 100 in its maximum lift or whose maximum may correspond to first maximum value r1−r2 or to second maximum value r3−r2 of lift curve 100.

As a particular advantage it may be provided that exhaust valve 15 is opened multiple times during the discharge phase only when the output variable of internal combustion engine 1, the engine speed in this example, falls below its predefined threshold value and the load of internal combustion engine 1, the driver intent moment in this example, exceeds its predefined threshold value. The described filling-enhancing and torque-enhancing effects of multiple opening operations of exhaust valve 15 during the discharge phase are made available only for the situation in which one drives at a low speed below the designated threshold value and at high load demand above the designated threshold value since improvement in the response of internal combustion engine 1 and in particular of the exhaust gas turbocharger is intended in exactly this operating range of internal combustion engine 1 in order to largely avoid the turbo lag. In a speed range below the predefined speed threshold value with a load demand also below the designated threshold value, exhaust valve 15 is then opened only once during the discharge phase with a short maximum lift in the order of magnitude of first maximum value r1−r2 or second maximum value r3−r2, for example. In this way, conventional operation of internal combustion engine 1 is implemented at low speeds with a short lift of exhaust valve 15, intake valve 60 also being able to be operated with a corresponding short lift in this operating range of internal combustion engine 1. For speeds above the predefined threshold value for the engine speed, the internal combustion engine is operated in a conventional manner with a long lift of intake valve 60 and exhaust valve 15 according to lift curves 105 and 95 in FIG. 4, in order to optimally allow for the shorter gas exchange phases in this operating range, at a high load in particular. In this advantageous refinement, three different cam profiles are required for the described operation of the internal combustion engine in order to achieve the three different lift curves for exhaust valve 15.

In this case, a switch must be made between the three different cam profiles.

In the case of the use of a fully variable valve control, known to those skilled in the art, an electrohydraulic or electromagnetic valve control by engine controller 35, for example, the opening and closing times of intake valve 60 and exhaust valve 15 may be set arbitrarily just as the curve of the lift of intake valve 60 and exhaust valve 15, so that, in this way, the described lift curves may be achieved particularly comfortably without a camshaft. A six-stroke operation is implemented due to the described two-time opening of exhaust valve 15 during the discharge phase, according to the exemplary embodiment in FIG. 4, and according to the cam profile in FIG. 2, whereas lift curves 95, 105 indicate conventional four-stroke operation.

The method and the device according to the present invention make it possible to increase the torque of internal combustion engine 1, which is achieved by improving the response of the possibly existing exhaust gas turbocharger and by improving the delivery degree, i.e., the filling.

What is claimed is:

1. A method for operating an internal combustion engine, the method comprising:

opening an exhaust valve of the combustion chamber of the internal combustion engine in a discharge phase of the internal combustion engine for discharging exhaust gas, generated via combustion, from a combustion chamber into an exhaust system of the internal combustion engine; and closing and reopening again the exhaust valve during this discharge phase;

wherein the opening speed of the exhaust valve during the discharge phase is higher in the case of multiple opening operations than for a single opening.

2. A method for operating an internal combustion engine, the method comprising:

opening an exhaust valve of the combustion chamber of the internal combustion engine in a discharge phase of the internal combustion engine for discharging exhaust gas, generated via combustion, from a combustion chamber into an exhaust system of the internal combustion engine; and closing and reopening again the exhaust valve during this discharge phase;

wherein, during the first opening, the exhaust valve is opened up to a 60 degrees crank angle in the discharge phase before a bottom dead center of a piston of the combustion chamber.

3. A method for operating an internal combustion engine, the method comprising:

opening an exhaust valve of the combustion chamber of the internal combustion engine in a discharge phase of the internal combustion engine for discharging exhaust gas, generated via combustion, from a combustion chamber into an exhaust system of the internal combustion engine; and closing and reopening again the exhaust valve during this discharge phase;

wherein, in the case of multiple opening operations, during the discharge phase the exhaust valve is opened up to a 90 degrees crank angle before a top dead center of a piston of the combustion chamber.

4. A method for operating an internal combustion engine, the method comprising:

opening an exhaust valve of the combustion chamber of the internal combustion engine in a discharge phase of the internal combustion engine for discharging exhaust gas, generated via combustion, from a combustion chamber into an exhaust system of the internal combustion engine; and closing and reopening again the exhaust valve during this discharge phase;

wherein the lift of the exhaust valve during the multiple opening operation has a maximum value that is less than or equal to the maximum value at the first opening.

5. A method for operating an internal combustion engine, the method comprising:

opening an exhaust valve of the combustion chamber of the internal combustion engine in a discharge phase of the internal combustion engine for discharging exhaust gas, generated via combustion, from a combustion chamber into an exhaust system of the internal combustion engine; and closing and reopening again the exhaust valve during this discharge phase;

wherein the durations of opening of the exhaust valve during the discharge phase are selected to be of approximately the same magnitude.

6. The method of claim 1, wherein a turbine of an exhaust gas turbocharger is driven using the exhausted exhaust gas.

7. The method of claim 1, wherein during the first opening, the exhaust valve is opened up to a 60 degrees crank angle in the discharge phase before a bottom dead center of a piston of the combustion chamber, and in the case of multiple opening operations, during the discharge phase the exhaust valve is opened up to a 90 degrees crank angle before a top dead center of a piston of the combustion chamber.

8. The method of claim 1, wherein the lift of the exhaust valve during the multiple opening operation has a maximum value that is less than or equal to the maximum value at the first opening, and wherein the durations of opening of the exhaust valve during the discharge phase are selected to be of approximately the same magnitude.

9. The method of claim 1, wherein during the first opening, the exhaust valve is opened up to a 60 degrees crank angle in the discharge phase before a bottom dead center of a piston of the combustion chamber, wherein in the case of multiple opening operations, during the discharge phase the exhaust valve is opened up to a 90 degrees crank angle before a top dead center of a piston of the combustion chamber, wherein the lift of the exhaust valve during the multiple opening operation has a maximum value that is less than or equal to the maximum value at the first opening, and wherein the durations of opening of the exhaust valve during the discharge phase are selected to be of approximately the same magnitude.

10. A device for operating an internal combustion engine, comprising:

an opening arrangement to open an exhaust valve of the combustion chamber of the internal combustion engine in a discharge phase of the internal combustion engine for discharging exhaust gas, generated via combustion, from a combustion chamber into an exhaust system of the internal combustion engine, and to close and reopen again the exhaust valve during this discharge phase;

wherein the opening speed of the exhaust valve during the discharge phase is higher in the case of multiple opening operations than for a single opening.

11. A device for operating an internal combustion engine, comprising:

an opening arrangement to open an exhaust valve of the combustion chamber of the internal combustion engine in a discharge phase of the internal combustion engine for discharging exhaust gas, generated via combustion, from a combustion chamber into an exhaust system of the internal combustion engine, and to close and reopen again the exhaust valve during this discharge phase;

wherein, during the first opening, the exhaust valve is opened up to a 60 degrees crank angle in the discharge phase before a bottom dead center of a piston of the combustion chamber.

12. A device for operating an internal combustion engine, comprising:

an opening arrangement to open an exhaust valve of the combustion chamber of the internal combustion engine in a discharge phase of the internal combustion engine for discharging exhaust gas, generated via combustion, from a combustion chamber into an exhaust system of the internal combustion engine, and to close and reopen again the exhaust valve during this discharge phase;

wherein, in the case of multiple opening operations, during the discharge phase the exhaust valve is opened up to a 90 degrees crank angle before a top dead center of a piston of the combustion chamber.

13. A device for operating an internal combustion engine, comprising:

an opening arrangement to open an exhaust valve of the combustion chamber of the internal combustion engine in a discharge phase of the internal combustion engine for discharging exhaust gas, generated via combustion, from a combustion chamber into an exhaust system of the internal combustion engine, and to close and reopen again the exhaust valve during this discharge phase;

wherein the lift of the exhaust valve during the multiple opening operation has a maximum value that is less than or equal to the maximum value at the first opening.

14. A device for operating an internal combustion engine, comprising:

an opening arrangement to open an exhaust valve of the combustion chamber of the internal combustion engine in a discharge phase of the internal combustion engine for discharging exhaust gas, generated via combustion, from a combustion chamber into an exhaust system of the internal combustion engine, and to close and reopen again the exhaust valve during this discharge phase;

wherein the durations of opening of the exhaust valve during the discharge phase are selected to be of approximately the same magnitude.

15. A device for operating an internal combustion engine, comprising:

an opening arrangement to open an exhaust valve of the combustion chamber of the internal combustion engine in a discharge phase of the internal combustion engine for discharging exhaust gas, generated via combustion, from a combustion chamber into an exhaust system of the internal combustion engine, and to close and reopen again the exhaust valve during this discharge phase;

wherein a turbine of an exhaust gas turbocharger is driven using the exhausted exhaust gas.

16. The device of claim 10, wherein during the first opening, the exhaust valve is opened up to a 60 degrees crank angle in the discharge phase before a bottom dead center of a piston of the combustion chamber, and in the case of multiple opening operations, during the discharge phase the exhaust valve is opened up to a 90 degrees crank angle before a top dead center of a piston of the combustion chamber.

17. The device of claim 10, wherein the lift of the exhaust valve during the multiple opening operation has a maximum value that is less than or equal to the maximum value at the first opening, and wherein the durations of opening of the exhaust valve during the discharge phase are selected to be of approximately the same magnitude.

18. The device of claim 10, wherein during the first opening, the exhaust valve is opened up to a 60 degrees crank angle in the discharge phase before a bottom dead center of a piston of the combustion chamber, wherein in the case of multiple opening operations, during the discharge phase the exhaust valve is opened up to a 90 degrees crank angle before a top dead center of a piston of the combustion chamber, wherein the lift of the exhaust valve during the multiple opening operation has a maximum value that is less than or equal to the maximum value at the first opening, and wherein the durations of opening of the exhaust valve during the discharge phase are selected to be of approximately the same magnitude.

* * * * *